June 7, 1955  R. C. RUSSELL  2,710,076
FRICTION BRAKE
Filed Sept. 26, 1952  2 Sheets-Sheet 1
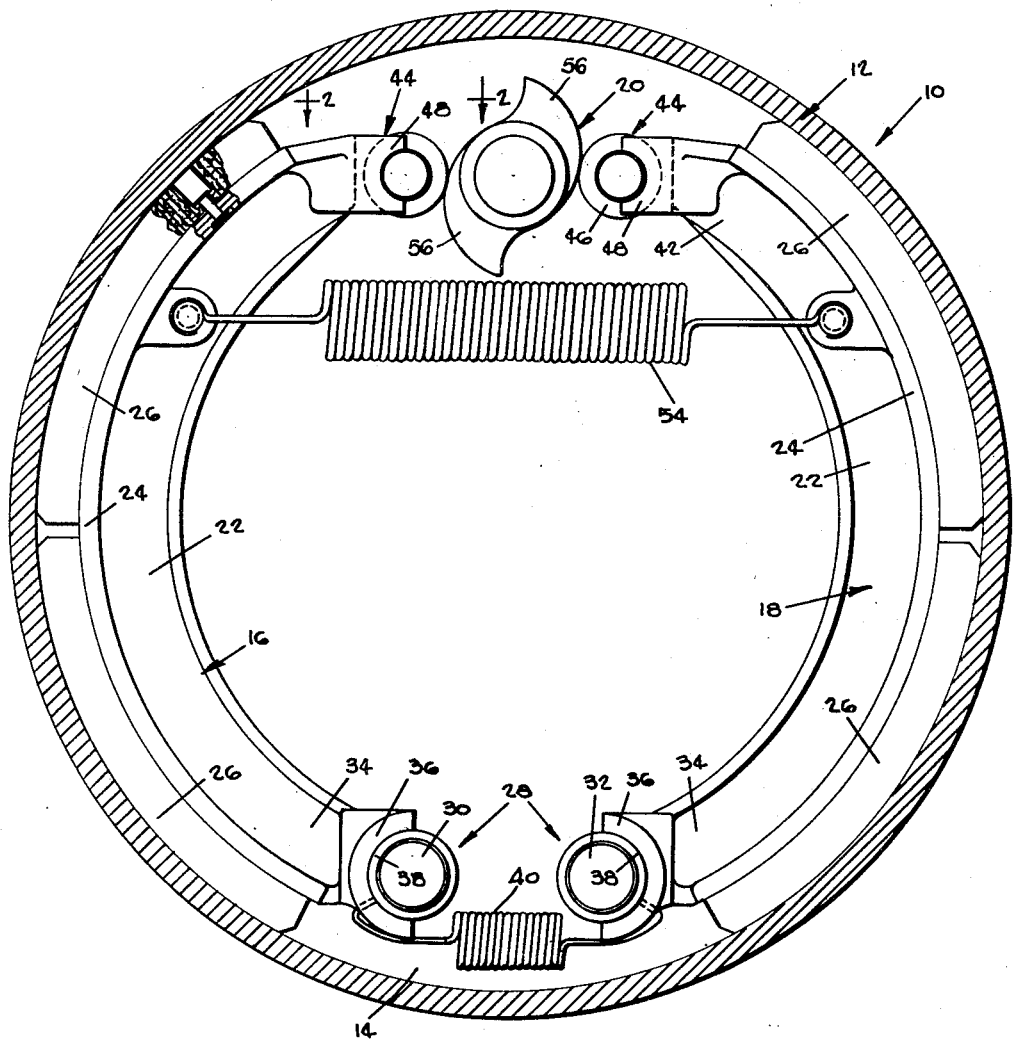
FIG_1
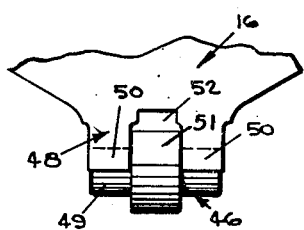
FIG_2
INVENTOR.
ROBERT C. RUSSELL
BY
ATTORNEYS June 7, 1955  R. C. RUSSELL  2,710,076
FRICTION BRAKE
Filed Sept. 26, 1952  2 Sheets-Sheet 2
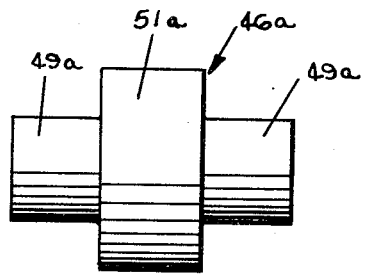
FIG_3
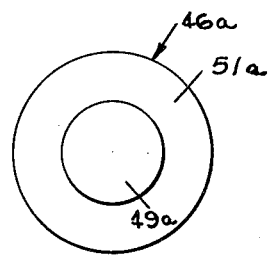
FIG_4
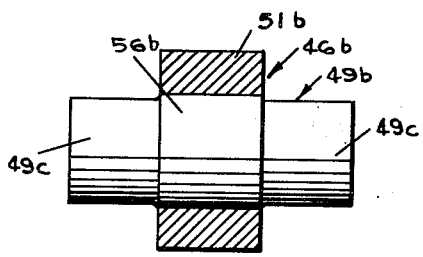
FIG_5
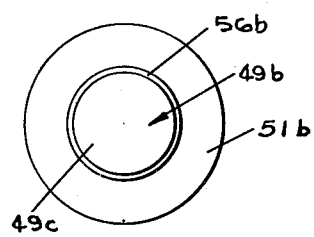
FIG_6
*INVENTOR.*
ROBERT C. RUSSELL
BY
ATTORNEYS

United States Patent Office 2,710,076
Patented June 7, 1955

2,710,076
FRICTION BRAKE

Robert C. Russell, South Euclid, Ohio, assignor to Eaton Manufacturing Company, Cleveland, Ohio, a corporation of Ohio Application September 26, 1952, Serial No. 311,589

6 Claims. (Cl. 188—78)

This invention relates to friction brakes for motor vehicles and more particularly to a novel roller cam follower brake shoe structure therefor.

Broadly the invention comprehends the provision of friction brakes for use primarily with heavy motor vehicles, such as trucks and the like and wherein the brake shoes therefor are of the roller cam follower type and each are provided with a split bearing structure on either one or both ends of the shoe. In the case of the split bearing structure on the input ends of the shoes, rollers are adapted to be supported therein whereas on the opposite or anchor ends thereof the split bearing structure engages an anchor for the shoes.

Heretofore friction brakes for a like purpose have utilized brake shoes of the roller cam follower type having full or solid bearings on their input end and wherein rollers therefor adapted to be engaged by actuating means for the shoes are supported in said bearings. These structures have not proved entirely satisfactory since the rollers sometimes freeze in the bearings and thus necessitate a costly servicing or possible replacement of the entire brake shoe and roller structure. Furthermore the supporting shafts for the rollers can be accidentally loosened and thus work free from assembled position in the shoes. The present brake shoe structure eliminates these major structural defects.

Among the several objects of the present invention is the provision of a friction brake including brake shoes of novel structure, that:

(a) Are easy and economical to service;

(b) Have a prolonged effective operating life;

(c) Include bearing supported rollers on the input end which will not freeze to the shoes and which cannot be accidentally dislodged from assembled working position; and (d) Have a split, open or half bearing structure on the input ends thereof with rollers supported for rotation thereon, said rollers being easily serviced or replaced without removal of the brake shoes from assembly.

Other objects and advantages of the invention will appear from the following description taken in connection with the drawings forming a part of the specification, and in which:

Fig. 1 is a front elevation view of a friction brake embodying the invention;

Fig. 2 is a fragmentary view taken substantially along lines 2—2 of Fig. 1;

Fig. 3 is an enlarged side elevation view of a roller structure for use in the brake of Fig. 1;

Fig. 4 is an end view of Fig. 3;

Fig. 5 is an enlarged partly cross-sectional view of a modified form of roller structure from that of Figs. 3 and 4; and Fig. 6 is an end view of Fig. 5.

Similar reference characters indicate corresponding parts throughout the several views of the drawings.

This novel brake shoe structure was devised primarily to overcome the disadvantages inherent in previously used roller cam follower type brake shoes whereby costly service and replacement is materially minimized if not entirely eliminated. By so supporting the cam actuated rollers on half, open or split bearing structures, as here proposed, they can be easily and quickly serviced and replaced. Furthermore the possibility of the rollers freezing in the shoes is virtually eliminated. The rollers and bearing support shafts therefor can be so constructed either as part of the roller or as a separate part relatively rotatable to the roller, such that in assembly on the shoe bearing therefor they can not be accidentally displaced from their operating position in the brake assembly.

Referring to the drawings for more specific details of the invention 10 represents generally a friction brake for heavy duty use such as of the type employed in trucks and the like.

Brake 10 comprises basically a rotatable drum 12, a stationary backing plate 14, a pair of brake shoes 16 and 18, and cam actuator means 20.

Brake shoes 16 and 18 are identical in structure and of somewhat conventional nature in that they each include a web portion 22 and a brake lining carrying flange 24 upon which are attached brake lining segments 26, said lining segments adapted upon outward radial actuation of the shoes, to engage the inner periphery of the drum for effecting a braking operation thereof.

Anchor means 28 are fixedly arranged on backing plate 14 and include anchor bearing posts 30 and 32 for engagement with anchor ends 34 of the respective shoes 16 and 18.

The anchor ends 34 of shoes 16 and 18 are in the form of split, open or half bearing structures 36 providing a semi-cylindrical bearing surface 38, each adapted to receive in engagement thereon the complementary cylindrical bearing surfaces of the anchor posts 30 and 32.

A tension spring 40 connected between the anchor ends 34 of shoes 16 and 18 serve to hold said ends in bearing anchored engagement on the posts 30 and 32.

Actuated ends 42 of shoes 16 and 18 are each provided with cam follower structures 44 in the form of roller means 46 supported for rotation in a split, open or half bearing structure 48 including axially spaced segments 50.

Trunnion roller means 46 each include a roller 51 and axially opposite shaft extensions 49 wherein the semi-cylindrical surfaced bearing segments 50 receive the shafts in bearing engagement thereon and the roller, which is purposely of larger diameter than the shaft extensions, extends into space 52 provided axially between the segments. As such the roller can rotate free of interference with the brake shoe with which associated.

The brake shoes 16 and 18 with the cam follower structures thereon are directed toward one another and are tensioned into engagement with the cam actuator means 20 by a tension spring 54 connected between the shoes near the actuated ends thereof. Diametrically opposite cams 56 of the actuator means 20 engage the rollers 51 of the respective brake shoes 16 and 18 whereby upon rotation of the cam means about a fixed axis an outward radial actuation of the shoes is effected with said shoes pivotal about their anchor posts 30 and 32.

The roller means 46 can be of varied structure such as roller means 46a of Figs. 3 and 4 wherein said means is of one piece construction including a roller 51a having shaft extensions 49a.

Figs. 5 and 6 illustrate a further modified form of roller means 46b wherein a two piece structure is provided including a roller 51b mounted in bearing rotatable relation on a shaft 49b, having axial opposite extensions for the support thereof.

Shaft 49b includes central portion 56 of an effective diameter greater than the diameter of the opposite axial extensions 49c thereof. Furthermore since the diameter of the semi-cylindrical surfaces of the brake shoe are made of a diameter substantially equal to the diameter of the shaft extensions, it will be impossible for the shaft 49b to become accidentally axially displaced from bearing support on the shoes during the operation thereof with the brake shoes.

In so providing the structure of Figs. 5 and 6, an effective double bearing relation is had wherein the shaft extensions 49c are journalled on the brake shoe and the roller 51b is journalled on the central portion 56b of the shaft 49b. As such even though this structure is not as economical as the structure of Figs. 3 and 4, it has material advantages thereover through double insurance against freezing of the roller 51b against rotation thereby prolonging the life of the roller through the maintenance of rolling engagement between the brake actuator cam and the roller. This continual rolling action serves to effectively distribute wear evenly over the entire circumferential surface of the roller.

While this invention has been described in connection with certain specific embodiments, the principle involved is susceptible of numerous other applications that will readily occur to persons skilled in the art. The invention, therefore, is limited only as indicated by the scope of the appended claims.

What I claim is:

1. In a brake assembly, a pair of brake shoes pivoted at adjacent ends, a cam disposed between the other ends of the shoes and rotatable about an axis therebetween, said cam having diametrically opposite operating surfaces, said shoes having substantially semi-cylindrical bearing means on said other ends thereof, a trunnion roller means including parts of substantially equal radius to the bearing means supported for free floating rotation on the bearing of each shoe and a portion of each trunnion means respectively engageable with said diametrically opposite surfaces of the cam, said bearing means having an entrance mouth of a size permitting of the free insertion and removal of the bearing supported parts of the roller means into and out of engagement with said bearing means, and spring means interconnected between the shoes urging said roller means into engagement with the cam surfaces.

2. In a brake assembly, a pair of brake shoes, anchor means for the shoes, one end of each shoe engageable with the anchor means, a rotatable cam, disposed between the other ends of the shoes, having diametrically opposite operating surfaces, said shoes having at said other ends arcuate bearing means, a trunnion roller means, for each shoe, including portions of substantially equal radius to the bearing means, supported for rotation on the bearing means of each shoe, and a portion engageable with one surface of the cam, opposite from the engagement of the other roller means with the opposite surface of the cam, said bearing means having an entrance mouth of a size permitting of the free insertion and removal of the bearing supported portions of the roller means into and out of engagement with said bearing means, and spring means interconnecting said brake shoes for urging said roller means into engagement with the cam surfaces.

3. In a brake assembly according to claim 2 wherein each of the trunnion roller means includes a shaft providing equal diameter portions at their opposite ends and an intermediate portion of greater diameter than said opposite ends and a roller supported on said central portion in bearing relation thereto and wherein said central portion is of a diameter greater than the diameter of the bearing means of the shoe.

4. In a brake assembly according to claim 2 wherein said one end of each shoe is provided with a substantially semi-cylindrical bearing means and the anchor means has complementary bearing means upon which the shoes have bearing engagement, and wherein second spring means interconnecting the shoes urge said one end of the shoes into engagement with the anchor means.

5. In a brake assembly according to claim 4 wherein the anchor means includes a pair of anchor pins and wherein said one end of each shoe is pivotally engageable on its respective anchor pin.

6. In a brake assembly, a pair of brake shoes pivoted at adjacent ends, a rotatable cam disposed between the other ends of the shoes, said shoes each having arcuate bearing means on said other ends thereof providing a pair of spaced arcuate bearing surfaces in axial alignment, a trunnion roller means for each brake shoe including axially spaced shaft means of substantially equal radius to the bearing means supported for rotation respectively on the bearing surfaces of its respective brake shoe and an intermediate roller engageable with the cam, said arcuate bearing surfaces extending through an arc no greater than 180°, and spring means interconnected between the shoes urging said rollers into engagement with the cam on opposite sides thereof.

References Cited in the file of this patent

UNITED STATES PATENTS

| | | |
|---|---|---|
| 799,699 | Winter | Sept. 19, 1905 |
| 1,787,494 | Sanford | Jan. 6, 1931 |
| 1,852,103 | Bendix | Apr. 5, 1932 |
| 1,871,458 | Lyman | Aug. 16, 1932 |
| 2,151,832 | Bugatti | Mar. 28, 1939 |
| 2,172,376 | Harris | Sept. 12, 1939 |
| 2,351,114 | Freeman | June 13, 1944 |
| 2,435,727 | Spencer | Feb. 10, 1948 |
| 2,632,234 | Fitz | Mar. 24, 1953 |

FOREIGN PATENTS

| | | |
|---|---|---|
| 630,299 | Germany | May 25, 1936 |
| 282,069 | Great Britain | Apr. 19, 1928 |